United States Patent
Shafin et al.

(10) Patent No.: US 12,273,812 B2
(45) Date of Patent: Apr. 8, 2025

(54) TWT SCHEDULE SWITCH OPERATION FOR MULTI-LINK DEVICES

(71) Applicant: Samsung Electronics Co., Ltd., Suwon-si (KR)

(72) Inventors: Rubayet Shafin, Allen, TX (US); Boon Loong Ng, Plano, TX (US); Peshal Nayak, Plano, TX (US); Ahmed Atef Ibrahim Ibrahim, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 17/813,895

(22) Filed: Jul. 20, 2022

(65) Prior Publication Data

US 2023/0037879 A1   Feb. 9, 2023

Related U.S. Application Data

(60) Provisional application No. 63/227,884, filed on Jul. 30, 2021.

(51) Int. Cl.
| | |
|---|---|
| *H04W 52/00* | (2009.01) |
| *H04W 52/02* | (2009.01) |
| *H04W 72/12* | (2023.01) |

(52) U.S. Cl.
CPC ....... *H04W 52/0216* (2013.01); *H04W 72/12* (2013.01)

(58) Field of Classification Search
CPC ............ H04W 52/0216; H04W 72/12
See application file for complete search history.

(56) References Cited

U.S. PATENT DOCUMENTS

| | | | |
|---|---|---|---|
| 2021/0144637 A1 | 5/2021 | Kwon et al. | |
| 2021/0329500 A1* | 10/2021 | Cariou | H04W 74/002 |

OTHER PUBLICATIONS

IEEE P802.11be-D0.4; Draft Standard for Information technology—Telecommunications and information exchange between systems Local and metropolitan area networks—Specific requirements; "Part 11: Wireless LAN Medium Access Control (MAC) and Physical Layer (PHY) Specifications—Amendment 8: Enhancements for extremely high throughput (EHT)" Mar. 2021, 511 pgs.

(Continued)

*Primary Examiner* — Erika A Washington

(57) ABSTRACT

Methods and apparatuses for facilitating the switching of an established target wake time (TWT) schedule from one link to another link of a multi-link device (MLD) in a wireless local area network. The apparatuses include an access point (AP) MLD comprising APs and a processor operably coupled to the APs. Each AP comprises a transceiver configured to form a link with a corresponding station (STA) affiliated with a non-AP MLD. The processor is configured to negotiate with the non-AP MLD via one of the APs to establish a TWT schedule for communications on a first one of the links, receive, from the non-AP MLD via one of the APs, a request to transfer the TWT schedule from the first link to a second one of the links, and in response to the request, establish the TWT schedule for communications on the second link.

20 Claims, 8 Drawing Sheets

(56) References Cited

OTHER PUBLICATIONS

IEEE P802.11ax/D8.0; Draft Standard for Information technology—Telecommunications and information exchange between systems Local and metropolitan area networks—Specific requirements; "Part 11: Wireless LAN Medium Access Control (MAC) and Physical Layer (PHY) Specifications"; "Amendment 1: Enhancements for High Efficiency WLAN" Oct. 2020; 820 pgs.
IEEE P802.11be-D1.5; Draft Standard for Information technology—Telecommunications and information exchange between systems Local and metropolitan area networks—Specific requirements; "Part 11: Wireless LAN Medium Access Control (MAC) and Physical Layer (PHY) Specifications—Amendment 8: Enhancements for extremely high throughput (EHT)" Mar. 2022, 831 pgs.
International Search Report and Written Opinion issued Nov. 1, 2022 regarding International Application No. PCT/KR2022/011109, 8 pages.
Shafin et al., "MLO: Broadcast TWT for MLDs", doc.: IEEE 802.11-21/0394r2, Jun. 2021, 13 pages.
Asterjadhi et al., "Comment resolutions for Individual TWT", doc.: IEEE 802.11-19/0725r1, May 2019, 9 pages.
Chu et al., "Low Latency Support", doc.: IEEE 802.111-20/1058r1, Oct. 2020, 10 pages.
Baek et al., "TGbe D0.3 Comment Resolutions for Restricted TWT SP", doc.: IEEE 802.11-21/0672r2, Jul. 2021, 4 pages.
Extended European Search Report issued Jun. 11, 2024 regarding Application No. 22849896.0, 11 pages.
Patil et al., "MLO: Link Info in Mgmt. Frames", doc.: IEEE 802.11-20/0824r0, Sep. 2020, 11 pages.
"MAC sublayer functional description", IEEE P802.11ax/D0.2, Jun. 2016, 15 pages.
Patil et al., "MLO: Link Info in Mgmt. Frames", doc.: IEEE 802.11-20/0824r1, Sep. 2020, 9 pages.

* cited by examiner

TWT SCHEDULE SWITCH OPERATION FOR MULTI-LINK DEVICES

CROSS-REFERENCE TO RELATED APPLICATION AND CLAIM OF PRIORITY

This application claims priority under 35 U.S.C. § 119(e) to U.S. Provisional Patent Application No. 63/227,884 filed on Jul. 30, 2021, which is hereby incorporated by reference in its entirety.

TECHNICAL FIELD

This disclosure relates generally to power saving operations for latency-sensitive traffic in wireless communications systems that include multi-link devices. Embodiments of this disclosure relate to methods and apparatuses for facilitating the switching of an established restricted target wake time schedule from one link to another link of a multi-link device in a wireless local area network communications system.

BACKGROUND

Wireless local area network (WLAN) technology allows devices to access the internet in the 2.4 GHz, 5 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a key feature for next generation extremely high throughput (EHT) WI-FI systems, e.g., IEEE 802.11be. The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD.

Target Wake Time (TWT) is one of the important features of the IEEE 802.11ax amendment. TWT enables wake time negotiation between an access point (AP) and an associated station (STA) for improving power efficiency. With TWT operation, it suffices for a STA to only wake up at pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT (bTWT) operation, an AP can set up a shared TWT session for a group of STAs.

The negotiated parameters such as the wake interval, wake duration and initial wake time (offset) highly affect latency, throughput as well as power efficiency, which are directly related to QoS (quality of service) or customer experiences. Services with different traffic characteristics will have different TWT parameter configurations for better QoS. Additionally, the TWT configuration should adapt to network and service status variation.

TWT allows the non-AP STAs to wake up at designated time only, and thereby reduce power consumption. Some applications (e.g., cloud gaming, AR glasses) can have periodic burst traffic with very strict latency requirements. In setting up TWT by a non-AP STA, the STA may not have the traffic delay information at the AP (i.e., arrival time of downlink traffic). It may lead to large delay between the DL traffic arrival time and TWT service period (SP) start time. This may severely affect latency-sensitive applications. If the non-AP STA has information on the traffic delay at the AP, it can accordingly adjust its TWT parameters and hence can better support TWT traffic.

Restricted TWT (rTWT) operation, which is based on broadcast TWT operation, is a feature introduced with a view to providing better support for latency sensitive applications. Restricted TWT offers a protected service period for its member STAs by sending Quiet elements to other STAs in the BSS which are not members of the restricted TWT schedule, where the Quiet interval corresponding to the Quiet element overlaps with the initial portion of the restricted TWT SP. Hence, it gives more channel access opportunity for the restricted TWT member scheduled STAs, which helps latency-sensitive traffic flow.

SUMMARY

Embodiments of the present disclosure provide methods and apparatuses for facilitating the switching of an established restricted TWT schedule from one link to another link of an MLD in a wireless local area network.

In one embodiment, an AP MLD is provided, comprising APs and a processor operably coupled to the APs. Each AP comprises a transceiver configured to form a link with a corresponding STA affiliated with a non-AP MLD. The processor is configured to negotiate with the non-AP MLD via one of the APs to establish a TWT schedule for communications on a first one of the links, receive, from the non-AP MLD via one of the APs, a request to transfer the TWT schedule from the first link to a second one of the links, and in response to the request, establish the TWT schedule for communications on the second link.

In another embodiment, a non-AP MLD is provided, comprising STAs and a processor operably coupled to the STAs. Each STA comprises a transceiver configured to form a link with a corresponding AP affiliated with an AP MLD. The processor is configured to negotiate with the AP MLD via one of the STAs to establish a TWT schedule for communications on a first one of the links, transmit, to the AP MLD via one of the STAs, a request to transfer the TWT schedule from the first link to a second one of the links, and establish the TWT schedule for communications on the second link.

In another embodiment, a method of wireless communication performed by an AP MLD is provided, including the steps of negotiating with a non-AP MLD to establish a TWT schedule for communications on a first link formed between the AP MLD and the non-AP MLD, receiving, from the non-AP MLD, a request to transfer the TWT schedule from the first link to a second link formed between the AP MLD and the non-AP MLD, and, in response to the request, establishing the TWT schedule for communications on the second link.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
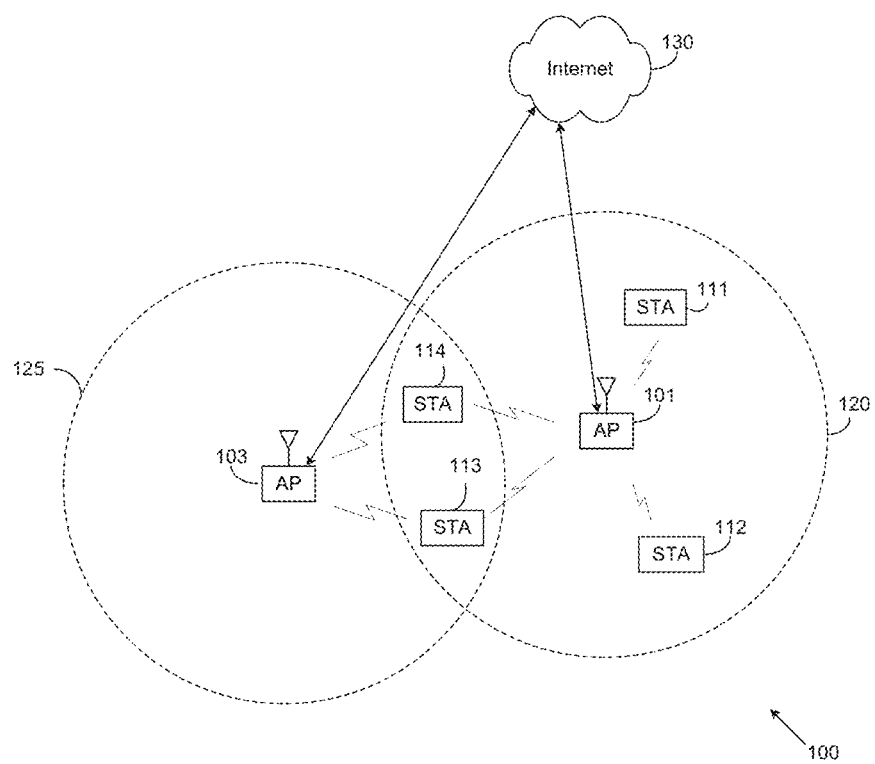
FIG. 1 illustrates an example wireless network according to various embodiments of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that EHT non-AP STAs can establish rTWT schedules with their associated APs. Likewise, a STA affiliated with a non-AP MLD can also establish rTWT schedules with an AP affiliated with an AP MLD over the corresponding link on which the STA and the AP are operating.

Embodiments of the present disclosure further recognize that the STA affiliated with the non-AP MLD may want to switch its rTWT schedule from one link to another. Such rTWT schedule switching can be defined as an operation where an rTWT schedule that is established on one link (between the non-AP MLD and an AP MLD) is transferred to another link (between the non-AP MLD and the AP MLD) without going through a new TWT negotiation process. The rTWT parameter set corresponding to the rTWT schedule on the new link can be the same as that of the initial link on which the rTWT schedule was established or, alternatively, a subset of the rTWT parameters on the new link can be inherited from the initial link on which the rTWT schedule was established.

There may be multiple scenarios where such rTWT schedule switching to other links is needed. For example, if the associated AP MLD decides, for some reason, to disable or delete the link on which an rTWT schedule was established between an rTWT scheduled STA affiliated with the non-AP MLD and an rTWT scheduling AP affiliated with the AP MLD, then it would be essential for the non-AP MLD to switch the rTWT schedule to a different link between the AP MLD and the non-AP MLD in order to maintain the latency-sensitive traffic flow.

A similar outcome to rTWT schedule switching can be achieved by first having the rTWT scheduled STA affiliated with the non-AP MLD tear down the existing rTWT schedule, and then having the rTWT scheduled STA start a new negotiation with the rTWT scheduling AP to establish the rTWT schedule over the new link. However, this process is quite time consuming, and can significantly disrupt latency-sensitive traffic.

Accordingly, embodiments of the present disclosure provide apparatuses and methods that facilitate switching rTWT schedules over multiple links swiftly and efficiently so that latency-sensitive traffic is not disrupted. Moreover, embodiments of the present disclosure define mechanisms by which the rTWT schedule switching is accomplished with very low signaling overhead.

Embodiments of the present disclosure also recognize that traffic identifier (TID)-to-Link mapping is an important aspect of rTWT schedule switching over multiple links. If the latency-sensitive TIDs—which were mapped to the link on which the rTWT schedule was established initially and that were allowed for transmission during the rTWT SP—are not mapped to the new link to which the rTWT schedule is going to be transferred, then the rTWT schedule cannot be switched to the new link unless a new TID-to-Link mapping is performed that maps those latency-sensitive TIDs to the new link.

Accordingly, embodiments of the present disclosure provide apparatuses and methods that integrate the TID-to-Link mapping operation into the rTWT schedule switching operation in order to ensure a seamless transfer of rTWT schedules from one link to another with low signaling overhead.

It is understood that because rTWT is a subset of TWT, any of the procedures discussed herein below with respect to rTWT will work with non-restricted TWT. Although the goal of rTWT (protecting latency-sensitive traffic) is served by reducing signaling overhead, it is understood that reducing signaling overhead is beneficial regardless of whether or not traffic is latency-sensitive, and therefore the embodiments of the present disclosure are desirable for TWT operation modes that do not necessarily involve latency-sensitive traffic.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating the switching of an established restricted TWT schedule from one link to another link of an MLD in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
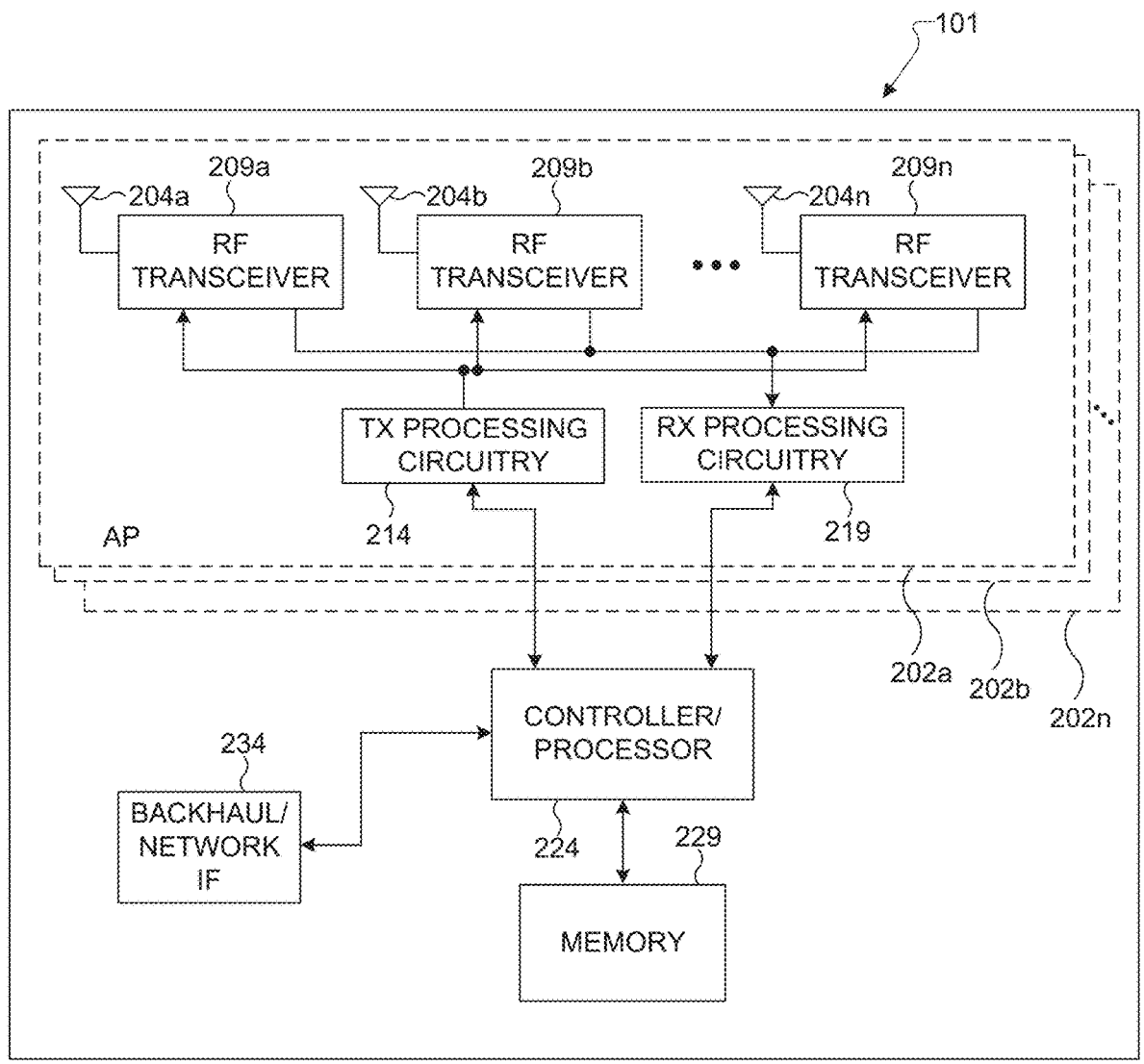
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating the switching of an established restricted TWT schedule from one link to another link of an MLD in WLANs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating the switching of an established restricted TWT schedule from one link to another link of an MLD in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
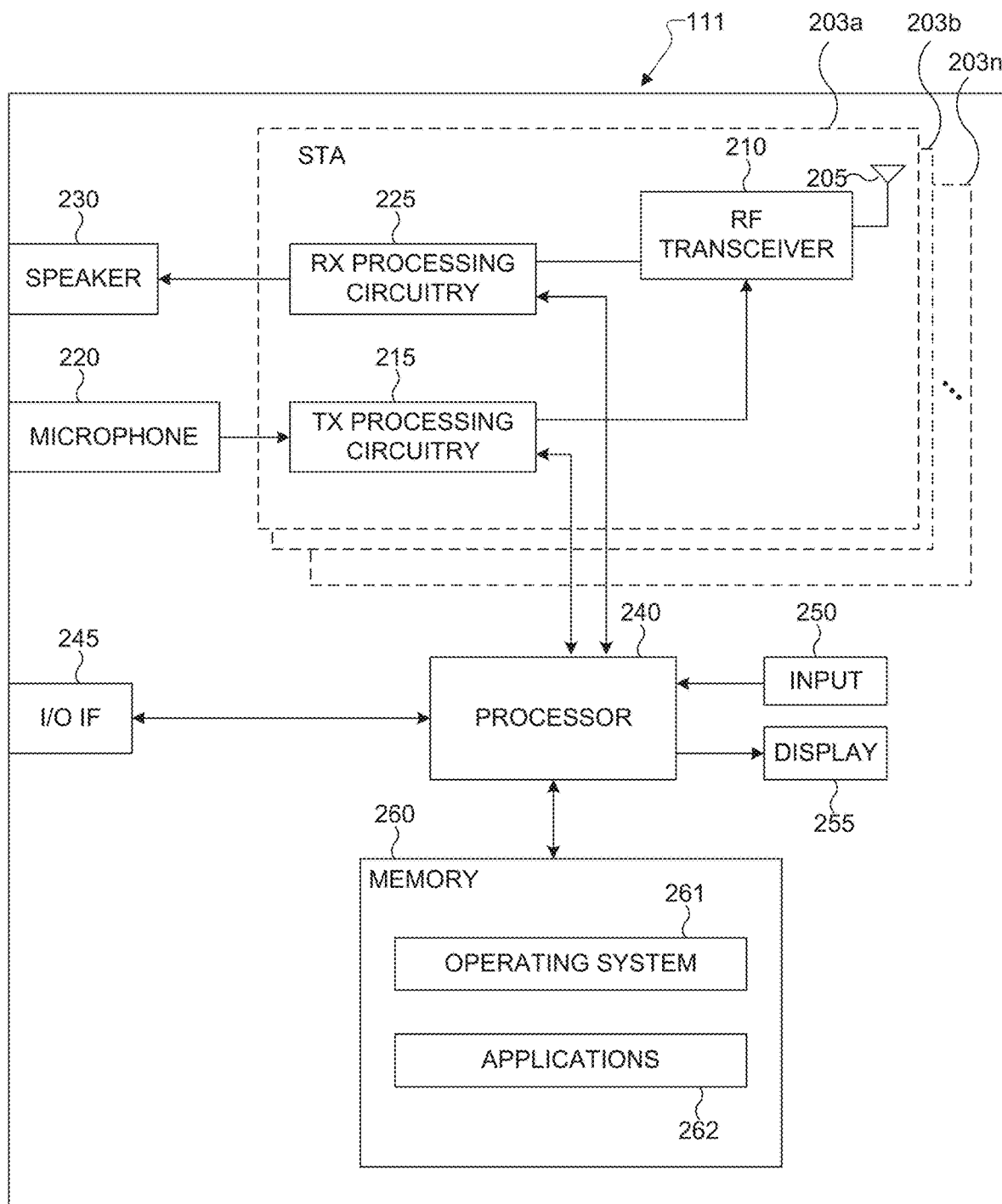
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate the switching of an established restricted TWT schedule from one link to another link of an MLD in WLANs. In some embodiments, the controller/processor 240 includes at least one microprocessor or microcontroller.

The controller/processor 240 is also capable of executing other processes and programs resident in the memory 260, such as operations for facilitating the switching of an established restricted TWT schedule from one link to another link of an MLD in WLANs. The controller/processor 240 can move data into or out of the memory 260 as required by an executing process. In some embodiments, the controller/processor 240 is configured to execute a plurality of applications 262, such as applications for facilitating the switching of an established restricted TWT schedule from one link to another link of an MLD in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Figure 3:
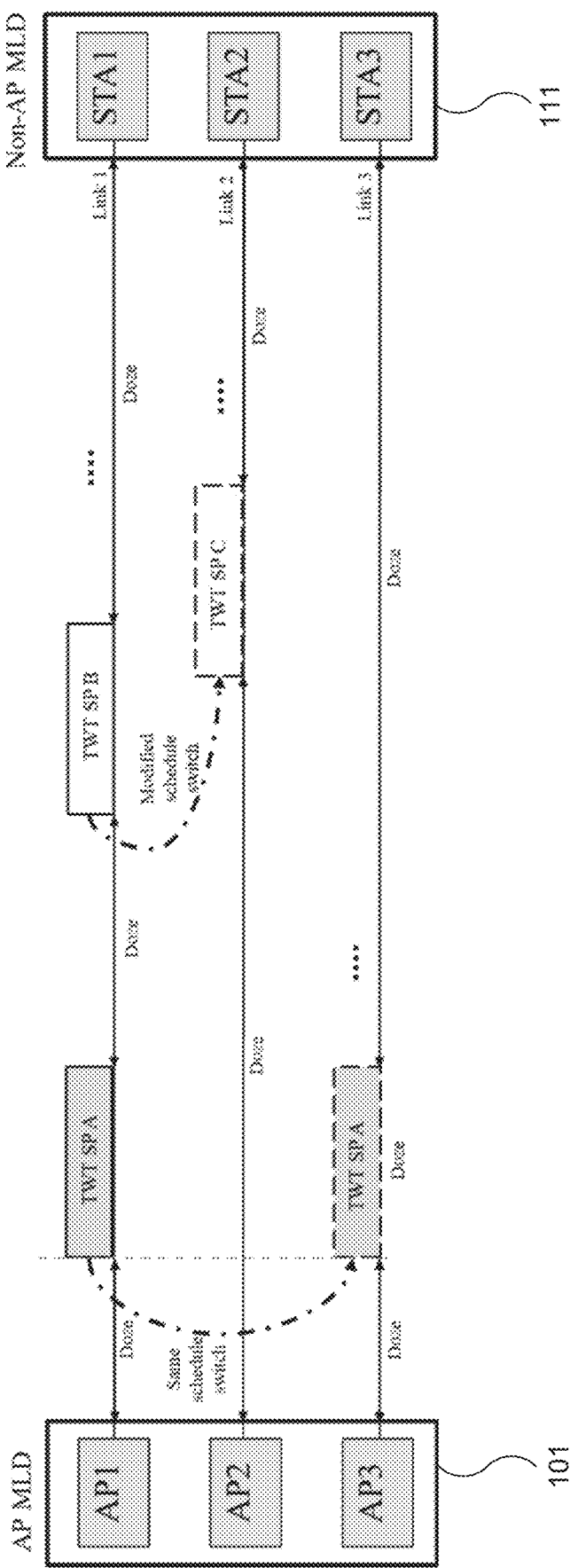
FIG. 3 illustrates an example of an operation switching a restricted TWT schedule from one link to another link between an AP MLD and a non-AP MLD according to embodiments of the present disclosure.

FIG. 3 illustrates an example of an operation switching a restricted TWT schedule from one link to another link between an AP MLD and a non-AP MLD according to embodiments of the present disclosure. Although the AP MLD 101 is illustrated with three affiliated APs and the non-AP MLD 111 is illustrated with three affiliated non-AP STAs, it is understood that this process could be applied with suitable MLDs having any number of affiliated APs or STAs. For ease of explanation, it is understood that references to an AP MLD and a non-AP MLD in further embodiments below refer to the AP MLD 101 and non-AP MLD 111, respectively.

In FIGS. 3, AP1, AP2, and AP3 are three APs affiliated with the AP MLD. STA1, STA2, and STA3 are three non-AP STAs affiliated with the non-AP MLD. Three links are set up between the AP MLD and the non-AP MLD—Link 1 between AP1 and STA1, Link 2 between AP2 and STA2, and Link 3 between AP3 and STA3. Link 1 and Link 3 are enabled, whereas Link 2 is disabled. Two restricted TWT schedules—restricted TWT schedule A corresponding to a Broadcast TWT Parameter Set A and restricted TWT schedule B corresponding to a Broadcast TWT Parameter Set B—are established on Link 1. The restricted TWT SPs corresponding to restricted TWT schedules A and B are illustrated as TWT SP A and TWT SP B, respectively.

If Link 1 is going to be disabled (or deleted), then in order to maintain the latency-sensitive traffic flow that uses the restricted TWT schedules, the existing restricted TWT schedules on Link 1 need to be transitioned to another link between the AP MLD and the non-AP MLD before Link 1 is disabled.

In FIG. 3, restricted TWT schedule A (corresponding to Broadcast TWT Parameter Set A) is switched from Link 1 (its initial link) to Link 3 (a new link). In this case, the exact same restricted TWT schedule is used on Link 3 as was established on Link 1—i.e., the exact same TWT parameters of Broadcast TWT Parameter Set A are applied to the restricted TWT schedule on Link 3, as illustrated by TWT SP A. At this point it is as if the restricted TWT schedule A has been established on Link 3, but no TWT negotiation process needed to be performed between the AP MLD and the non-AP MLD to do so.

Meanwhile, restricted TWT schedule B (corresponding to Broadcast TWT Parameter Set B) is switched from Link 1 to Link 2. In this case, a modified form of restricted TWT schedule B is used on Link 2 as compared to the restricted TWT schedule that was established on Link 1—i.e., at least some TWT parameters of Broadcast TWT Parameter Set B are modified for use on Link 3, as illustrated by TWT SP C. At this point it is as if the modified form of restricted TWT schedule B has been established on Link 2, but no TWT negotiation process needed to be performed between the AP MLD and the non-AP MLD to do so. Mechanisms for modifying the TWT parameter set are discussed further below, as are reasons for making such modifications.

When making the restricted TWT schedule switch from one link to another link between the AP MLD and the non-AP MLD, there can be two scenarios in terms of TID-to-Link mapping. If the TIDs that are mapped to the initial link over which the rTWT schedule is established for latency-sensitive traffic flow during the rTWT SP are also mapped to the new link to which the rTWT schedule is transitioning due to rTWT schedule switching, no additional steps need to be taken in terms of TID-to-Link mapping in order to facilitate the rTWT schedule switch. Referring to FIG. 3, if the TIDs that are allowed for restricted TWT SP A on Link 1 are also mapped to Link 3, then no additional TID-to-Link mapping negotiation is needed in order to switch the restricted TWT schedule A from Link 1 to Link 3.

On the other hand, if any of the TIDs that are mapped to the initial link over which the rTWT schedule is established for latency-sensitive traffic flow during the rTWT SP are not mapped to the new link to which the rTWT schedule is transitioning due to rTWT schedule switching, then those TIDs first need to be mapped to the new link before the rTWT schedule switching can happen. Referring to FIG. 3, in order to switch restricted TWT schedule B from Link 1 to Link 2, new TID-to-Link mapping needs to be negotiated since Link 2 is disabled, and the TIDs which are allowed for restricted TWT SP B on Link 1 need to be mapped on Link 2 before restricted TWT schedule B can be switched to Link 2.

Assuming that all TIDs that are mapped to the initial link for latency-sensitive traffic during rTWT SP are also mapped to the new link to which the rTWT schedule is going to be switched, then the rTWT schedule switching process can be initiated by either the non-AP MLD or the AP MLD. For ease of explanation, discussion herein below may refer to only one of the non-AP MLD or the AP MLD sending a frame or element to initiate the rTWT schedule switching process, but it is understood that both the AP MLD and the non-AP MLD may be configured to perform either the initiator or respondent role.

According to some embodiments, the non-AP MLD or the AP MLD may send an element (e.g., an rTWT Schedule Switch element or Restricted TWT Schedule Switch element as defined below) to its associated AP MLD or non-AP MLD over any setup link between the AP MLD and the non-AP MLD in order to request an rTWT schedule switch from the initial link to the new link.

According to one such embodiment, the requested schedule on the new link can be exactly the same as that on the initial link (i.e., all of the parameters related to the rTWT schedule are the same). According to this embodiment, the non-AP MLD can send an rTWT Schedule Switch element to the AP MLD over any setup link between the AP MLD and the non-AP MLD to indicate the switching of an existing restricted TWT schedule from one link between an AP MLD and a non-AP MLD to another link between the same AP MLD and non-AP MLD.

Figure 4A:
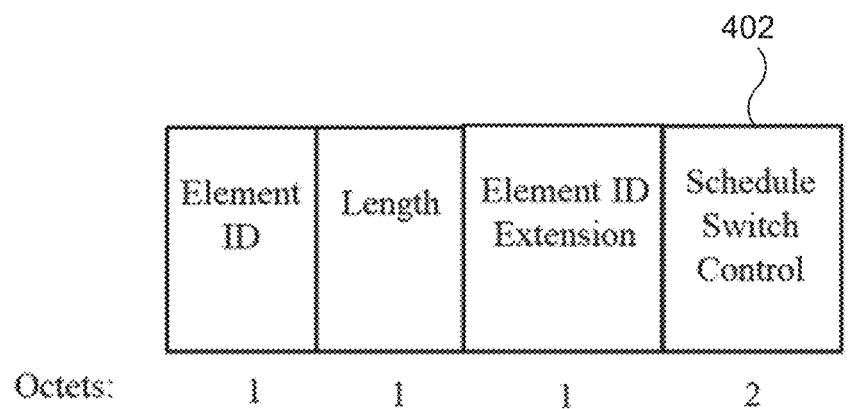
FIG. 4A illustrates an example format of an rTWT Schedule Switch element according to various embodiments of the present disclosure.

FIG. 4A illustrates an example format of an rTWT Schedule Switch element according to various embodiments of the present disclosure. The rTWT Schedule Switch element includes Schedule Switch Control field 402.

Figure 4B:
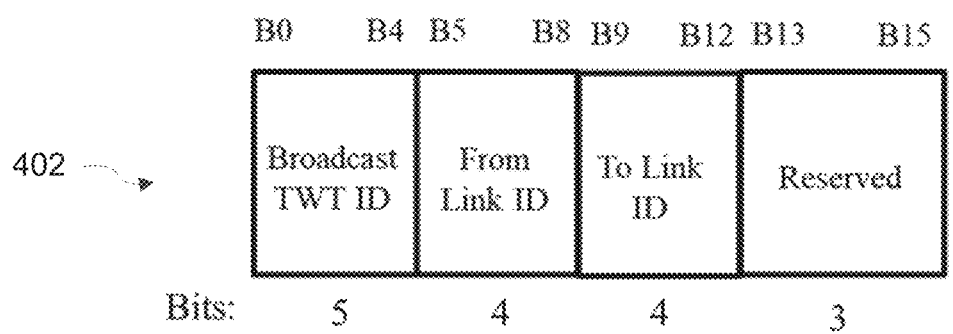
FIG. 4B illustrates an example format of a Schedule Switch Control field in an rTWT Schedule Switch element according to various embodiments of the present disclosure.

FIG. 4B illustrates an example format of a Schedule Switch Control field in an rTWT Schedule Switch element according to various embodiments of the present disclosure. FIG. 4B may represent an example of the Schedule Switch Control field 402 of FIG. 4A.

The Broadcast TWT ID subfield of the Schedule Switch Control field in the rTWT Schedule Switch element contains the Broadcast TWT ID of the restricted TWT schedule for which the schedule switch has been requested. The From Link ID subfield of the Schedule Switch Control field in the rTWT Schedule Switch element contains the Link ID of the link between the AP MLD and the non-AP MLD from which the restricted TWT schedule is requested to be switched. The subfield tuple <Broadcast TWT ID, From Link ID> uniquely identifies the broadcast TWT schedule (which in this case is a restricted TWT schedule) that needs to be transitioned to another link. The To Link ID subfield of the Schedule Switch Control field in the rTWT Schedule Switch element contains the Link ID of the link between the AP MLD and the non-AP MLD to which the restricted TWT schedule is requested to be switched.

It is possible that, in some cases, the new link between the AP MLD and the non-AP MLD to which the rTWT schedule is requested to be switched may not accommodate the same exact schedule that needs to be switched from the initial link. This situation can occur if the new link to which the rTWT schedule is requested to be switched already has existing constraints. For example, the new link may have an existing restricted TWT schedule that would overlap with the requested rTWT schedule. In such scenarios, a modified form of the requested restricted TWT schedule may need to be accommodated in the new link in order to maintain seamless flow of the latency-sensitive traffic that was initially scheduled for transmission during restricted TWT SP corresponding to the rTWT schedule identified by the <Broadcast TWT ID, From Link ID> tuple.

Modification of the rTWT schedule that is requested to be switched from an initial link to a new link can be based on modification of a few parameters included in the Broadcast TWT Parameter Set field corresponding to the requested rTWT schedule. According to some embodiments, these parameters can include Target Wake Time, Nominal Minimum TWT Wake Duration, TWT Wake Interval Mantissa, Broadcast TWT Persistence, and TWT Wake Interval Exponent. According to other embodiments, parameters other than the ones listed above may also possibly be included in the list of parameters that can be modified for switching an rTWT schedule from one link to another.

According to some embodiments, a Restricted TWT Schedule Switch element can be used to indicate the switching of an existing restricted TWT schedule from one link between an AP MLD and a non-AP MLD to another link between the same AP MLD and non-AP MLD. The Restricted TWT Schedule Switch element can accommodate a modified version of the requested rTWT schedule switch as well as the exact rTWT schedule switch. In this way, the Restricted TWT Schedule Switch element may differ from the rTWT Schedule Switch element.

Figure 5A:
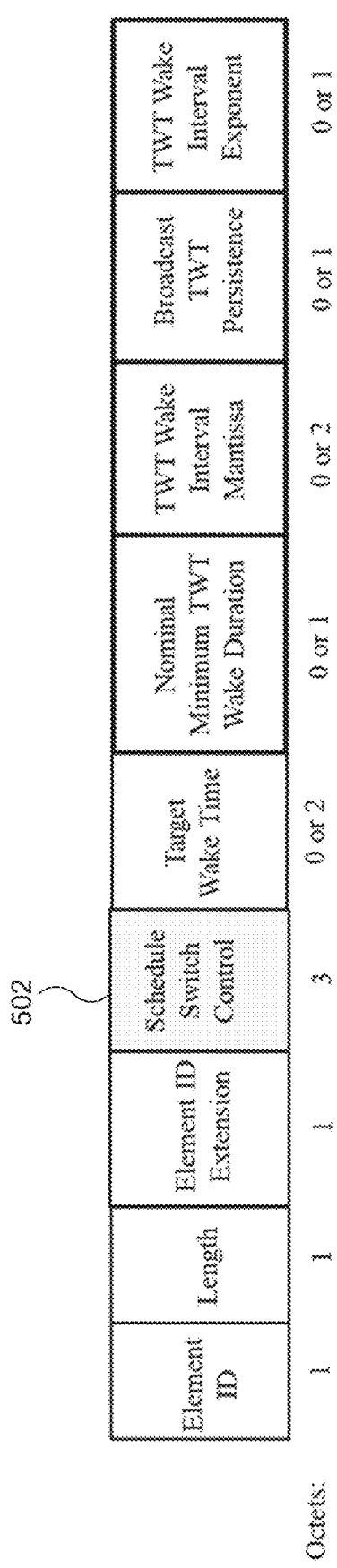
FIG. 5A illustrates an example format of a Restricted TWT Schedule Switch element according to various embodiments of the present disclosure.

FIG. 5A illustrates an example format of a Restricted TWT Schedule Switch element according to various embodiments of the present disclosure. The Restricted TWT Schedule Switch element includes a Schedule Switch Control field 502.

Figure 5B:
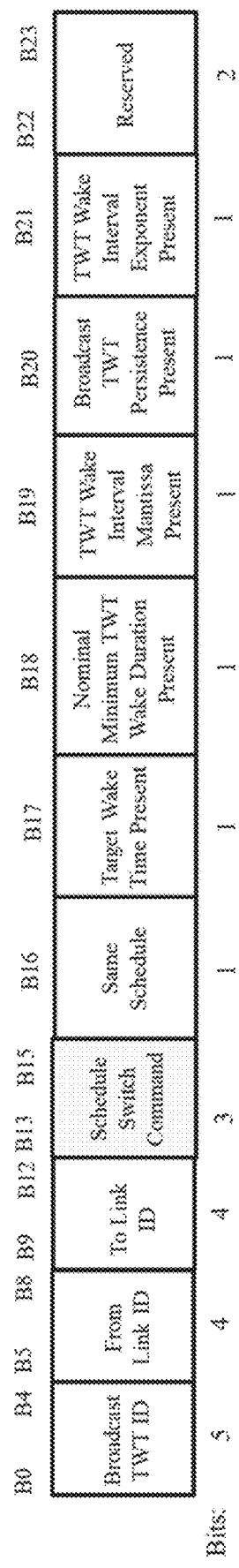
FIG. 5B illustrates an example format of a Schedule Switch Control field of a Restricted TWT Schedule Switch element according to various embodiments of the present disclosure.

FIG. 5B illustrates an example format of a Schedule Switch Control field of a Restricted TWT Schedule Switch element according to various embodiments of the present disclosure. FIG. 5B may represent an example of the Schedule Switch Control field 502 of FIG. 5A.

The Broadcast TWT ID subfield of the Schedule Switch Control field in the Restricted TWT Schedule Switch element contains the Broadcast TWT ID of the restricted TWT schedule for which the schedule switch has been requested. The From Link ID subfield of the Schedule Switch Control field in the Restricted TWT Schedule Switch element contains the Link ID of the link between the AP MLD and the non-AP MLD from which the restricted TWT schedule is requested to be switched. The subfield tuple <Broadcast TWT ID, From Link ID> uniquely identifies the existing broadcast TWT schedule that needs to be transitioned to another link. The To Link ID subfield of the Schedule Switch Control field in the Restricted TWT Schedule Switch element contains the Link ID of the link between the AP MLD and the non-AP MLD to which the restricted TWT schedule is requested to be switched. The Schedule Switch Command subfield in the Schedule Switch Control field in the Restricted TWT Schedule Switch element contains command values associated with frame exchanges corresponding to an rTWT schedule switch. A description of the values of the Schedule Switch Command subfield is presented in Table 1.

TABLE 1

| Schedule Switch Command subfield value | Command name | Description |
| --- | --- | --- |
| 0 | Request Schedule Switch | An rTWT schedule switch initiating STA affiliated with a non-AP MLD or an rTWT schedule switch initiating AP affiliated with an AP MLD requests to switch an existing rTWT schedule from one link to another link between the non-AP MLD and the associated AP MLD. |
| 1 | Suggest Schedule Switch | An rTWT schedule switch initiating STA affiliated with a non-AP MLD or an rTWT schedule switch initiating AP affiliated with an AP MLD requests to switch an existing rTWT schedule from one link to another link between the non-AP MLD and the associated AP MLD, and specifies a suggested set of rTWT parameters that need to be modified for switching the schedule to the new link between the AP MLD and the non-AP MLD. If the suggested rTWT schedule switch parameters are not accommodated by the corresponding rTWT schedule switch responding AP affiliated with the AP MLD or rTWT schedule switch responding STA affiliated with the non-AP MLD, the rTWT schedule switch initiating STA or rTWT schedule switch initiating AP might still accept the rTWT schedule switch parameters modified by the rTWT schedule switch responding STA or rTWT schedule switch responding AP. |
| 2 | Demand Schedule Switch | An rTWT schedule switch initiating STA affiliated with a non-AP MLD or an rTWT schedule switch initiating AP affiliated with an AP MLD requests to switch an existing rTWT schedule from one link to another link between the AP MLD and the non-AP MLD with a suggested set of rTWT parameters for the corresponding schedule that is to be established on the new link. If the request is not accommodated by the corresponding rTWT schedule switch responding AP or STA, the rTWT schedule switch initiating STA or AP will reject the rTWT schedule switch. |
| 3 | Accept Schedule Switch | An rTWT schedule switch responding STA affiliated with a non-AP MLD or an rTWT schedule switch responding AP affiliated with an AP MLD accepts the request to switch an rTWT schedule from one link to another link between the AP MLD and the non-AP MLD. This command is also used in unsolicited rTWT schedule switch responses. |
| 4 | Alternate Schedule Switch | An rTWT schedule switch responding STA affiliated with a non-AP MLD or an rTWT schedule switch responding AP affiliated with an AP MLD suggests rTWT schedule switch parameters different than the ones that have been requested by the corresponding rTWT schedule switch initiating STA affiliated with the non-AP MLD or rTWT schedule switch initiating AP affiliated with the AP MLD. |

TABLE 1-continued

| Schedule Switch Command subfield value | Command name | Description |
|---|---|---|
| 5 | Dictate Schedule Switch | An rTWT schedule switch responding STA affiliated with a non-AP MLD or an rTWT schedule switch responding AP affiliated with an AP MLD indicates rTWT schedule switch parameters different than the ones that have been requested by the corresponding rTWT schedule switch initiating STA affiliated with the non-AP MLD or rTWT schedule switch initiating AP affiliated with the AP MLD. |
| 6 | Reject Schedule Switch | An rTWT schedule switch responding STA affiliated with a non-AP MLD or an rTWT schedule switch responding AP affiliated with an AP MLD rejects an rTWT schedule switch request or suggestion made by the corresponding rTWT schedule switch initiating AP or rTWT schedule switch initiating STA. |
| 7 | Reserved | |

According to the values of the Schedule Switch Command subfield of the Schedule Switch Control field, the TWT schedule switching request can in some embodiments initiate a process that is similar to a TWT negotiation. However, this represents a "light" negotiation that foregoes much of the overhead included in TWT negotiation.

The Same Schedule subfield in the Schedule Switch Control field of the Restricted TWT Schedule Switch element indicates whether or not the restricted TWT schedule to be established on the new link between the AP MLD and the non-AP MLD due to the rTWT schedule switching event is exactly the same as the restricted TWT schedule of the initial link from which the rTWT schedule is switched. Here "the same schedule" refers to the same set of parameters in a Broadcast TWT Parameter Set field in a broadcast TWT element used to establish the rTWT schedules both on the initial link and on the new link. If the Same Schedule subfield is set to 1, it indicates that the exact same schedule is switched from the initial link to the new link. If the Same Schedule is set to 0, it indicates that the restricted TWT schedule to be established on the new link due to the rTWT schedule switching event is different from the restricted TWT schedule established on the initial link. If the Same Schedule subfield is set to 0, then rTWT parameters corresponding to the rTWT schedule that are modified for the new link (i.e., modified from the parameters of the restricted TWT schedule established on the initial link) are included in the Restricted TWT Schedule Switch element. These parameters can be Target Wake Time, Nominal Minimum TWT Wake Duration, TWT Wake Interval Mantissa, Broadcast TWT Persistence, and TWT Wake Interval Exponent.

According to some embodiments of the case in which the Same Schedule subfield is set to 0, inheritance rules can be applied to indicate which of the rTWT parameters are modified for the new link with respect to the parameters for the corresponding schedule on the initial link. For example, the absence of a particular restricted TWT parameter in the Restricted TWT Schedule Switch element would indicate that the absent parameter's value for the restricted TWT schedule on the new link is inherited from that parameter's value for the corresponding restricted TWT schedule on the initial link (i.e., it is the same as the initial parameter).

According to some such embodiments, the presence of a particular restricted TWT parameter in the Restricted TWT Schedule Switch element can be indicated by corresponding presence subfields in the Schedule Switch Control field of the Restricted TWT Schedule Switch element. For example, if the Target Wake Time Present subfield in the Schedule Switch Control field (as illustrated in FIG. 5B) is set to 1, it would indicate that a Target Wake Time field is present in the Restricted TWT Schedule Switch element. If the Target Wake Time Present subfield in the Schedule Switch Control field is set to 0, it would indicate that the Target Wake Time field is not present in the Restricted TWT Schedule Switch element, and its value would be inherited from the rTWT schedule on the initial link. This can be applied similarly to any other presence subfields, e.g., in FIG. 5B, Nominal Minimum TWT Wake Duration Present, TWT Wake Interval Mantissa Present, Broadcast TWT Persistence Present, and TWT Wake Interval Exponent Present.

According to one embodiments, if the Same Schedule subfield in the Schedule Switch Control field of the Restricted TWT Schedule Switch element is set to 1, then the values for the Target Wake Time Present, Nominal Minimum TWT Wake Duration Present, TWT Wake Interval Mantissa Present, Broadcast TWT Persistence Present, and TWT Wake Interval Exponent Present subfields would be set to 0, and fields corresponding to the Target Wake Time, Nominal Minimum TWT Wake Duration, TWT Wake Interval Mantissa, Broadcast TWT Persistence, and TWT Wake Interval Exponent parameters would not be present in the Restricted TWT Schedule Switch element.

According to another embodiment, if the Same Schedule subfield in the Schedule Switch Control field in the Restricted TWT Schedule Switch element is set to 1, then fields corresponding to the Target Wake Time, Nominal Minimum TWT Wake Duration, TWT Wake Interval Mantissa, Broadcast TWT Persistence, and TWT Wake Interval Exponent parameters would not be present in the Restricted TWT Schedule Switch element regardless of the values set for the Target Wake Time Present, Nominal Minimum TWT Wake Duration Present, TWT Wake Interval Mantissa Present, Broadcast TWT Persistence Present, and TWT Wake Interval Exponent Present subfields.

According to various embodiments, the respondent device (e.g., an rTWT schedule switch responding STA affiliated with the non-AP MLD or an rTWT schedule switch responding AP affiliated with the AP MLD) may use one of the above element formats for a response frame sent to the initiating device (e.g., an rTWT schedule switch initiating AP affiliated with the AP MLD or an rTWT schedule switch initiating STA affiliated with the non-AP MLD). For example, in response to receiving an rTWT Schedule Switch element in a request frame the respondent device may send an identical rTWT Schedule Switch element in a response frame to indicate that the request is accepted. Alternatively, in response to receiving an rTWT Schedule Switch element in a request frame the respondent device may send a Restricted TWT Schedule Switch element in a response frame, with values that suggest a modified set of TWT parameters as compared to the parameters of the requested TWT schedule established on the initial link. Likewise, in response to receiving a Restricted TWT Schedule Switch element in a request frame the respondent device may send a Restricted TWT Schedule Switch element in a response frame, with values that accept the requested TWT schedule or that suggest a modification of the schedule for use on the new link.

According to one embodiment, when switching the TWT schedule from an initial link to a new link between an AP MLD and a non-AP MLD, the timing synchronization function (TSF) value of the initial link is used as a reference TSF for the corresponding rTWT schedule wake time on the new link. According to another embodiment, the AP MLD and non-AP MLD align the TSF of the new link to the TSF of the initial link through implementation. According to another embodiment, TSF values can be different in the initial link and the new link (for example, the TSF value of the new link can be used as the reference TSF for the corresponding rTWT schedule wake time on the new link), and accordingly some offset in target wake times in the initial link and the new link is allowed.

As discussed above, if the TIDs (in particular the latency-sensitive TIDs) which are mapped to the link on which the rTWT schedule is established initially and that are allowed for transmission during the rTWT SP on the initial link are also mapped on the new link to which the rTWT schedule is requested to be transitioned through rTWT schedule switching, then no new TID-to-Link mapping negotiation is needed between the AP MLD and the non-AP MLD in order to accommodate the rTWT schedule on the new link. However, if the TIDs which are mapped to the link on which the rTWT schedule is established initially and that are allowed for transmission during the rTWT SP on the initial link are not mapped on the new link to which the rTWT schedule is requested to be transitioned through rTWT schedule switching, then TID-to-Link mapping should be renegotiated in order to accommodate the rTWT schedule to be switched on the new link.

If TID-to-Link mapping needs to be negotiated for accommodating an rTWT schedule switch, then, according to one embodiment, a request-response based TID-to-Link mapping negotiation process can take place independently of and before the restricted TWT schedule switching process takes place. According to this embodiment, an rTWT schedule switch initiating STA affiliated with the non-AP MLD or an rTWT schedule switch initiating AP affiliated with the AP MLD can initiate the necessary TID-to-Link mapping negotiation.

According to another embodiment, a TID-to-Link mapping negotiation can be integrated with the frame exchanges for the restricted TWT schedule switching process. According to this embodiment, an rTWT schedule switch initiating STA affiliated with the non-AP MLD or an rTWT schedule switch initiating AP affiliated with the AP MLD can include, in the same frame, a TID-to-Link Mapping element along with the Restricted TWT Schedule Switch element or rTWT Schedule Switch element. This inclusion of the TID-to-Link Mapping element would indicate that a change in the existing TID-to-Link mapping is needed to accommodate the requested rTWT schedule switch and the necessary TID-to-Link mapping changes are reflected in the included TID-to-Link Mapping element.

According to one embodiment, an rTWT schedule switch responding STA affiliated with the non-AP MLD or an rTWT schedule switch responding AP affiliated with the AP MLD may or may not include, in the same frame in response to the restricted TWT schedule switch request, a TID-to-Link Mapping element along with the Restricted TWT Schedule Switch element or rTWT Schedule Switch element. If the rTWT schedule switch responding STA or rTWT schedule switch responding AP does not include a TID-to-Link Mapping element in the response frame along with the Restricted TWT Schedule Switch element or rTWT Schedule Switch element, it would indicate that the rTWT schedule switch responding STA or rTWT schedule switch responding AP agrees with (or accepts) the requested TID-to-Link mapping requested by the rTWT schedule switch initiating STA or rTWT schedule switch initiating AP.

According to another embodiment, if the rTWT schedule switch responding STA or rTWT schedule switch responding AP includes a TID-to-Link Mapping element in the same response frame along with the Restricted TWT Schedule Switch element or rTWT Schedule Switch element, it would indicate that the rTWT schedule switch responding STA or rTWT schedule switch responding AP does not accept the TID-to-Link mapping requested by the rTWT schedule switch initiating STA or rTWT schedule switch initiating AP. According to this embodiment, the TID-to-Link Mapping element sent by the rTWT schedule switch responding STA or rTWT schedule switch responding AP would reflect the TID-to-Link mapping suggested by the rTWT schedule switch responding STA or rTWT schedule switch responding AP.

An rTWT schedule switch initiating STA or rTWT schedule switch initiating AP can send one or more Restricted TWT Schedule Switch elements or rTWT Schedule Switch elements by including them in a Restricted TWT Schedule Switch Request frame. If new TID-to-Link mapping negotiations need to be performed in order to accommodate the requested restricted TWT schedule switch, TID-to-Link Mapping elements can also be included in the Restricted TWT Schedule Switch Request frame. An example format of the Restricted TWT Schedule Switch Request frame is shown in Table 2.

TABLE 2

| Order | Information | Notes |
| --- | --- | --- |
| 1 | Category | |
| 2 | EHT Action | |
| 3 | Dialog Token | |
| 4 | 0 or more TID-to-Link Mapping elements | Included when TID-to-Link mapping is needed for restricted TWT schedule switch corresponding to Restricted TWT Schedule Switch element included in the frame |

TABLE 2-continued

| Order | Information | Notes |
|---|---|---|
| 5 | 1 or more Restricted TWT Schedule Switch elements or rTWT Schedule Switch elements | Each element corresponds to one restricted TWT schedule |

An rTWT schedule switch responding STA or rTWT schedule switch responding AP can send one or more Restricted TWT Schedule Switch elements or rTWT Schedule Switch elements by including them in the Restricted TWT Schedule Switch Response frame. If new TID-to-Link mapping negotiations need to be performed in order to accommodate the requested restricted TWT schedule switch, and if the rTWT schedule switch responding STA or rTWT schedule switch responding AP does not accept the TID-to-Link mapping suggested by the rTWT schedule switch initiating STA or rTWT schedule switch initiating AP, the corresponding rTWT schedule switch responding STA or rTWT schedule switch responding AP can include TID-to-Link Mapping elements in the Restricted TWT Schedule Switch Response frame in order to indicate its suggested mapping. An example format of the Restricted TWT Schedule Switch Response frame is shown in Table 3.

TABLE 3

| Order | Information | Notes |
|---|---|---|
| 1 | Category | |
| 2 | EHT Action | |
| 3 | Dialog Token | |
| 4 | 0 or more TID-to-Link Mapping elements | Included when TID-to-Link mapping is needed for restricted TWT schedule switch corresponding to Restricted TWT Schedule Switch element included in the frame |
| 5 | 1 or more Restricted TWT Schedule Switch elements or rTWT Schedule Switch elements | Each element corresponds to one restricted TWT schedule |

According to one embodiment, even if an rTWT schedule switch responding STA or rTWT schedule switch responding AP does not accept the TID-to-Link mapping requested by the rTWT schedule switch initiating STA or rTWT schedule switch initiating AP, it may not include a TID-to-Link Mapping element in the Restricted TWT Schedule Switch Response frame. However, the rTWT schedule switch responding STA or rTWT schedule switch responding AP may include a Restricted TWT Schedule Switch element in the Restricted TWT Schedule Switch Response frame with the Schedule Switch Command subfield in the Schedule Switch Control field of the Restricted TWT Schedule Switch element set to 6 (Reject Schedule Switch). According to one embodiment, the Dialog Token in the Restricted TWT Schedule Switch Response frame would be set to "Unsuccessful TID-to-Link Mapping Negotiation".

According to another embodiment, if the rTWT schedule switch responding STA or rTWT schedule switch responding AP accepts the suggested TID-to-Link mapping but rejects the rTWT schedule switch due to, for example, unacceptable rTWT parameters requested by the rTWT schedule switch initiating STA or rTWT schedule switch initiating AP for establishing the rTWT schedule on the new link between the AP MLD and the non-AP MLD, the restricted TWT schedule switch request is still considered to be rejected. In this case, the Dialog Token in the Restricted TWT Schedule Switch Response frame would be set to "Unacceptable rTWT Parameters Requested".

According to yet another embodiment, if an rTWT schedule switch responding STA or rTWT schedule switch responding AP accepts neither the requested TID-to-Link mapping nor the requested rTWT parameters corresponding to the rTWT schedule that is requested to be established on the new link, the Dialog Token in the Restricted TWT Schedule Switch Response frame would be set to "Unacceptable TID-to-Link Mapping and Requested rTWT Parameters".

According to another embodiment, if an rTWT schedule switch responding STA or rTWT schedule switch responding AP does not accept an rTWT schedule switch request, it may not include in the Restricted TWT Schedule Switch Response frame any of a TID-to-Link Mapping element, a Restricted TWT Schedule Switch element, or an rTWT Schedule Switch element. In this case, in order to indicate the rejection of the rTWT schedule switch requested by the rTWT schedule switch initiating STA or rTWT schedule switch initiating AP, the Dialog Token in the Restricted TWT Schedule Switch Response frame would be set to an appropriate command, e.g., "Unsuccessful TID-to-Link Mapping Negotiation", "Unacceptable rTWT Parameters Requested", or "Unacceptable TID-to-Link Mapping and Requested rTWT Parameters". Since the Dialog Token cannot identify any specific rTWT schedule switch request, this would indicate that all rTWT schedule switch requests made by the rTWT schedule switch initiating STA or rTWT schedule switch initiating AP are rejected.

According to another embodiment, if an rTWT schedule switch responding STA or rTWT schedule switch responding AP accepts all rTWT schedule switch requests, it may not include in the Restricted TWT Schedule Switch Response frame any of a TID-to-Link Mapping element, a Restricted TWT Schedule Switch element, or an rTWT Schedule Switch element. In this case, in order to indicate the acceptance of all of the rTWT schedule switches requested by the rTWT schedule switch initiating STA or rTWT schedule switch initiating AP, the Dialog Token in the Restricted TWT Schedule Switch Response frame would be set to "Accept All Schedule Switch Request".

Figure 6:
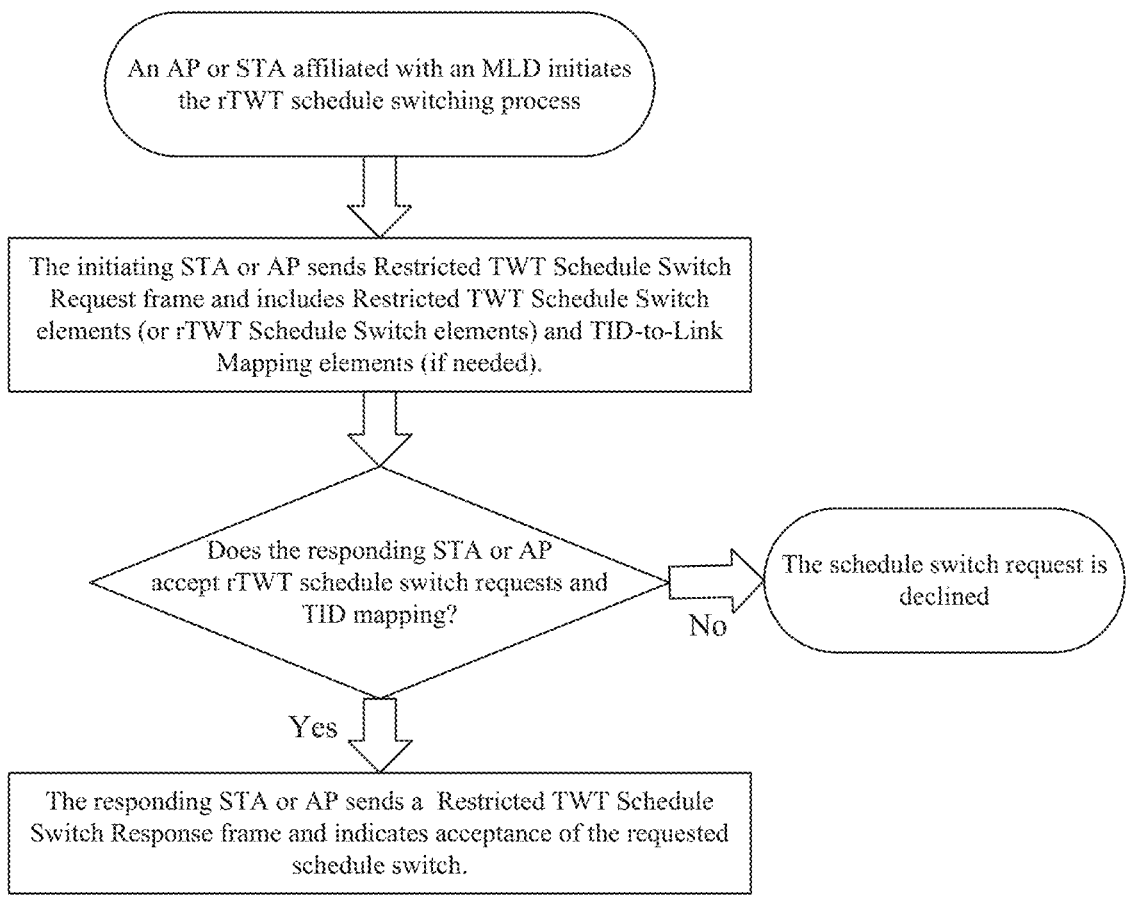
FIG. 6 illustrates a high level example of a restricted TWT schedule switching process according to various embodiments of the present disclosure.

FIG. 6 illustrates a high level example of a restricted TWT schedule switching process according to various embodiments of the present disclosure. One embodiment of this example, based on the scenario of FIG. 3 and incorporating the above embodiments, is discussed below.

It is assumed in this example that STA1 intends to switch restricted TWT Schedule A and restricted TWT Schedule B, respectively, from Link 1 to Link 3 and from Link 1 to Link 2. Accordingly, STA1 is the rTWT schedule switch initiating STA and AP1 is the rTWT schedule switch responding AP. In this example, the TIDs that are allowed for the restricted TWT SP corresponding to restricted TWT schedule A (TWT SP A) on Link 1 are also mapped on Link 3. However, the TIDs that are allowed for the restricted TWT SP corresponding to restricted TWT schedule B (TWT SP B) on Link 1 are not mapped to Link 2—in fact, Link 2 is disabled.

In order to initiate the schedule switching process, STA1 sends a Restricted TWT Schedule Switch Request frame to AP1. The frame contains two Restricted TWT Schedule Switch elements. The first—Restricted TWT Schedule Switch element X—contains information regarding switching restricted TWT schedule A from Link 1 to Link 3, and the second—Restricted TWT Schedule Switch element Y—contains information regarding switching restricted TWT schedule B from Link 1 to Link 2. Since the TIDs that are allowed for restricted TWT schedule B on Link 1 are not mapped to Link 2, STA1 also includes a TID-to-Link Mapping element in the Restricted TWT Schedule Switch Request frame. The TID-to-Link Mapping element included in the Restricted TWT Schedule Switch Request frame reflects the necessary TID-to-Link mapping information in order to accommodate the establishment of restricted TWT schedule B on Link 2.

STA1 intends to switch the exact same restricted TWT Schedule A from Link 1 to Link 3—i.e., the requested rTWT parameters corresponding to restricted TWT Schedule A on Link 3 are the same as those of restricted TWT Schedule A on Link 1. However, STA1 intends to switch a modified restricted TWT Schedule B from Link 1 to Link 2—specifically, STA1 intends to set a Nominal Minimum TWT Wake Duration value for the restricted TWT schedule B on Link 2 that is different from the Nominal Minimum TWT Wake Duration value for the restricted TWT schedule B on Link 1. Accordingly, STA1 sets the Same Schedule subfield value to 1 in Restricted TWT Schedule Switch element X and sets the Same Schedule subfield value to 0 in Restricted TWT Schedule Switch element Y. Moreover, in Restricted TWT Schedule Switch element Y, STA1 sets the Nominal Minimum TWT Wake Duration Present subfield to 1, and all other presence subfields to 0. STA1 also includes the desired Nominal Minimum TWT Wake Duration field in the Restricted TWT Schedule Switch element Y. For both Restricted TWT Schedule Switch element X and Restricted TWT Schedule Switch element Y, the Schedule Switch Command subfields are set to Request Schedule Switch.

Upon receiving the Restricted TWT Schedule Switch Request frame, AP1, in response, sends a Restricted TWT Schedule Switch Response frame that includes two Restricted TWT Schedule Switch elements. The first—Restricted TWT Schedule Switch element M—is a response to Restricted TWT Schedule Switch element X, and the second—Restricted TWT Schedule Switch element N—is a response to Restricted TWT Schedule Switch element Y. In both Restricted TWT Schedule Switch element M and Restricted TWT Schedule Switch element N, the Schedule Switch Command subfields are set to Accept Schedule Switch. Aside from the Schedule Switch Command subfield, the values of the other subfields of Restricted TWT Schedule Switch element M are the same as the values of the corresponding subfields of Restricted TWT Schedule Switch element X Similarly, aside from the Schedule Switch Command subfield, the values of the other subfields of Restricted TWT Schedule Switch element N are the same as the values of the corresponding subfields of Restricted TWT Schedule Switch element Y. Accordingly, the restricted TWT schedule A is switched from Link 1 to Link 3, and a modified restricted TWT schedule B is switched from Link 1 to Link 2.

Figure 7:
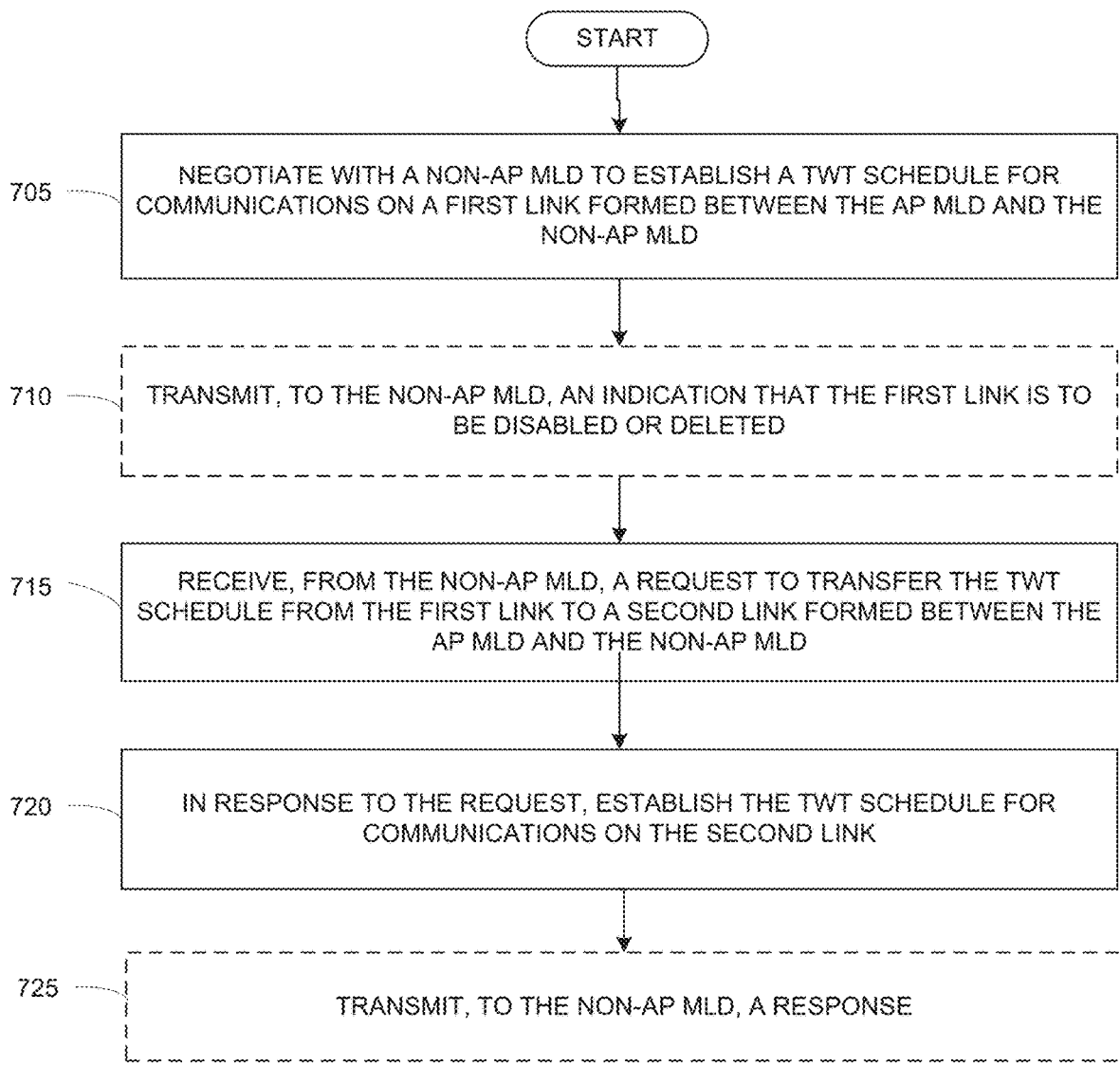
FIG. 7 illustrates an example process for facilitating the switching of an established restricted TWT schedule from one link to another link of an MLD in a WLAN according to various embodiments of the present disclosure.

FIG. 7 illustrates an example process for facilitating the switching of an established restricted TWT schedule from one link to another link of an MLD in a WLAN according to various embodiments of the present disclosure. The process of FIG. 7 is discussed as being performed by an AP MLD, which is in the initiating role as an rTWT schedule switch initiating device, but it is understood that a corresponding non-AP MLD performs a corresponding process in the respondent role as an rTWT schedule switch responding device. It is further understood that these roles could be reversed, and the process of FIG. 7 could be performed with the non-AP MLD in the initiating role and the AP MLD in the respondent role. Additionally, for convenience the process of FIG. 7 is discussed as being performed by a WI-FI AP MLD comprising a plurality of APs that each comprise a transceiver configured to configured to form a link with a corresponding STA affiliated with a WI-FI non-AP MLD. However, it is understood that any suitable wireless communication device could perform these processes.

Referring to FIG. 7, the process begins with the AP MLD negotiating with the non-AP MLD to establish a TWT schedule for communications on a first link formed between the AP MLD and the non-AP MLD (step 705). The TWT schedule may be a restricted TWT schedule. The negotiation establishes a set of TWT parameters to be used for communications under the TWT schedule on the first link.

In some embodiments, the AP MLD next transmits, to the non-AP MLD, an indication that the first link is to be disabled or deleted (step 710). In other embodiments, the non-AP MLD may be notified that the first link is to be disabled or deleted through other means, or may determine that the first link is to be disabled or deleted on its own.

At step 715, the AP MLD receives, from the non-AP MLD, a request to transfer the TWT schedule from the first link to a second link formed between the AP MLD and the non-AP MLD. If step 710 was performed, then the request of step 715 is in response to the indication of step 710.

In some embodiments, the request includes information indicating a modified set of TWT parameters to be used for the communications on the second link, where the modified set of TWT parameters is modified based on the set of TWT parameters that was negotiated to be used for the communications under the TWT schedule established on the first link. In other embodiments, the request indicates that the same set of TWT parameters that was negotiated to be used for the communications under the TWT schedule established on the first link is to be used for the communications on the second link. Such an indication may be made through the absence of a modified set of TWT parameters in the request.

In some embodiments, the request includes information indicating a new TID-to-link mapping for the second link to accommodate use of the TWT schedule for the communications on the second link. This information may be included in addition to the above information related to the set of TWT parameters to be used for the communications on the second link.

In response to the request, the AP MLD establishes the TWT schedule for communications on the second link (step 720). In the event that the request includes the information indicating a modified set of TWT parameters to be used for the communications on the second link, the AP MLD establishes the TWT schedule for the communications on the second link using the modified set of TWT parameters. In the event that the request indicates that the same set of TWT parameters that is used for the communications on the first link is to be used for the communications on the second link, the AP MLD establishes the TWT schedule for the communications on the second link using the same set of TWT parameters that is used for the communications on the first link.

In other embodiments, the AP MLD may determine that a different set of TWT parameters must be used in order to establish the TWT schedule for the communications on the second link. In such a case, the AP MLD may perform a light negotiation with the non-AP MLD to confirm the different set of TWT parameters before establishing the TWT schedule for the communications on the second link using the different set of TWT parameters.

Next, the AP MLD may transmit, to the non-AP MLD, a response to the request (step 725). In some embodiments, the response may include information indicating that the AP MLD accepts or rejects the request. The response may also include different suggested TWT parameters to be used for the communications on the second link (e.g., if the AP MLD determines that the TWT parameters indicated by the request cannot be used on the second link). In such a case, the response of step 725 may be transmitted before step 720.

In embodiments in which the request includes information indicating a new TID-to-link mapping for the second link, the response may include an indication that the new TID-to-link mapping is accepted. This indication may be made by the absence of a TID-to-link mapping in the response. In other embodiments in which the request includes information indicating a new TID-to-link mapping for the second link, the response may include information indicating a different new TID-to-link mapping for the second link (e.g., a TID-to-link mapping that the AP MLD has determined is necessary).

The above flowcharts illustrate example methods or processes that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

According to one embodiment, if a restricted TWT schedule is established on a first link between an AP MLD and a non-AP MLD, and if the first link is announced to be disabled or removed, then the AP MLD can provide sufficient time, after the announcement is made and before the link is disabled or removed, for the non-AP MLD to negotiate another restricted TWT schedule on a second link as a replacement of the soon-to-be-removed or soon-to-be-disabled restricted TWT schedule on the first link in order for seamless latency-sensitive traffic flows.

According to one embodiment, for a link (e.g., the first link) disablement announced through advertised TID-to-Link mapping, if a restricted TWT schedule is established on the first link between an AP MLD and a non-AP MLD, and if the first link is announced to be disabled, then the value in the Mapping Switch Time field of the TID-to-Link mapping element included in the Beacon or Probe Response frame can be set in a way such that it gives sufficient time for a non-AP MLD that has a restricted TWT schedule established on the first link to negotiate and establish an alternative restricted TWT schedule on a second link between the same AP MLD and the non-AP MLD.

According to one embodiment, if a first restricted TWT schedule is established on a first link between an AP MLD and a non-AP MLD, and if the first link is announced to be disabled or removed, then the AP MLD or the non-AP MLD can establish a second restricted TWT schedule on a second link between the AP MLD and the non-AP MLD as a replacement for the first restricted TWT schedule on the first link. According to one embodiment, the AP affiliated with the AP MLD and operating on the second link between the AP MLD and the non-AP MLD can establish the second restricted TWT schedule on the second link by setting Accept TWT or Alternate TWT, or Dictate TWT in the TWT Setup Command field of the Restricted TWT Parameter Set field of the Broadcast TWT element used for establishing the second restricted TWT schedule on the second link. According to another embodiment, the rTWT scheduled STA can set Demand TWT or Request TWT in the TWT Setup Command field for establishing the second restricted TWT schedule on the second link. According to one embodiment, the TWT parameters of the second restricted TWT schedule on the second link should be the same as or similar to (e.g., as close as possible to) the TWT parameters of the first restricted TWT schedule on the first link so that it respects or accommodates the traffic pattern of the latency-sensitive traffic flow for which the non-AP MLD established the first restricted TWT schedule on the first link. According to one embodiment, the TIDs that are negotiated for the first restricted TWT schedule on the first link can also be applicable for the second restricted TWT schedule on the second link. According to one embodiment, if one or more TIDs that are negotiated for the first restricted TWT schedule on the first link are not mapped on the second link, then the AP MLD or the non-AP MLD negotiates a TID-to-Link mapping, before the second restricted TWT schedule is established on the second link, so that those TIDs are mapped on the second link. According to one embodiment, the TWT Setup frame and the TWT element within it can be used for establishing the second restricted TWT schedule on the second link. According to one embodiment, the AP MLD and the non-AP MLD, for establishing the second restricted TWT schedule on the second link, can try to minimize the number of TWT Setup frame exchanges so that the second restricted TWT schedule is successfully established on the second link before the first link is disabled or removed. According to another embodiment, the second restricted TWT schedule on the second link can be in effect after the first link is disabled or removed. According to another embodiment, the second restricted TWT schedule on the second link can be in effect at the first target wake time (TWT) of the first TWT SP corresponding to the second restricted TWT schedule after the first link is disabled or removed.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An access point (AP) multi-link device (MLD), comprising:
APs, each comprising a transceiver configured to form a link with a corresponding station (STA) of a non-AP MLD; and
a processor operably coupled to the APs, the processor configured to:
negotiate with the non-AP MLD via one of the APs to establish a target wake time (TWT) schedule for communications on a first one of the links,
receive, from the non-AP MLD via one of the APs, a request to transfer the TWT schedule from the first link to a second one of the links, and
in response to the request, establish the TWT schedule for communications on the second link.

2. The AP MLD of claim 1, wherein:
the processor is further configured to establish the TWT schedule for the communications on the second link using a same set of TWT parameters that was negotiated for the communications on the first link.

3. The AP MLD of claim 1, wherein:
the request includes information indicating a modified set of TWT parameters to be used for the communications on the second link,
the modified set of TWT parameters is modified based on a set of TWT parameters that was negotiated to be used for the communications on the first link, and
the processor is further configured to establish the TWT schedule for the communications on the second link using the modified set of TWT parameters.

4. The AP MLD of claim 1, wherein the processor is further configured to:
use a timing synchronization function (TSF) value of the first link as a reference TSF value for a wake time of the TWT schedule on the second link, or
use a TSF value of the second link as a reference TSF value for the wake time of the TWT schedule on the second link.

5. The AP MLD of claim 1, wherein:
the request includes information indicating a new traffic identifier (TID)-to-link mapping for the second link to accommodate use of the TWT schedule for the communications on the second link, and
the processor is further configured to transmit, to the non-AP MLD via one of the APs, a response that indicates that the new TID-to-link mapping is accepted.

6. The AP MLD of claim 1, wherein:
the request includes information indicating a new traffic identifier (TID)-to-link mapping for the second link to accommodate use of the TWT schedule for the communications on the second link, and
the processor is further configured to transmit, to the non-AP MLD via one of the APs, a response that includes information indicating a different new TID-to-link mapping for the second link to accommodate the use of the TWT schedule for the communications on the second link.

7. The AP MLD of claim 1, wherein:
the processor is further configured to transmit, to the non-AP MLD via one of the APs, an indication that the first link is to be disabled or deleted, and
the request to transfer the TWT schedule from the first link to the second link is a response to the indication.

8. A non-access point (AP) multi-link device (MLD), comprising:
stations (STAs), each comprising a transceiver configured to form a link with a corresponding AP affiliated with an AP MLD; and
a processor operably coupled to the STAs, the processor configured to:
negotiate with the AP MLD via one of the STAs to establish a target wake time (TWT) schedule for communications on a first one of the links,
transmit, to the AP MLD via one of the STAs, a request to transfer the TWT schedule from the first link to a second one of the links, and
establish the TWT schedule for communications on the second link.

9. The non-AP MLD of claim 8, wherein:
the processor is further configured to establish the TWT schedule for the communications on the second link using a same set of TWT parameters that was negotiated for the communications on the first link.

10. The non-AP MLD of claim 8, wherein:
the request includes information indicating a modified set of TWT parameters to be used for the communications on the second link,
the modified set of TWT parameters is modified based on a set of TWT parameters that was negotiated to be used for the communications on the first link, and
the processor is further configured to establish the TWT schedule for the communications on the second link using the modified set of TWT parameters.

11. The non-AP MLD of claim 8, wherein the processor is further configured to:
use a timing synchronization function (TSF) value of the first link as a reference TSF value for a wake time of the TWT schedule on the second link, or
use a TSF value of the second link as a reference TSF value for the wake time of the TWT schedule on the second link.

12. The non-AP MLD of claim 8, wherein:
the request includes information indicating a new traffic identifier (TID)-to-link mapping for the second link to accommodate use of the TWT schedule for the communications on the second link, and
the processor is further configured to receive, from the AP MLD via one of the STAs, a response that indicates that the new TID-to-link mapping is accepted.

13. The non-AP MLD of claim 8, wherein:
the request includes information indicating a new traffic identifier (TID)-to-link mapping for the second link to accommodate use of the TWT schedule for the communications on the second link, and
the processor is further configured to receive, from the AP MLD via one of the STAs, a response that includes information indicating a different new TID-to-link mapping for the second link to accommodate the use of the TWT schedule for the communications on the second link.

14. The non-AP MLD of claim 8, wherein:
the processor is further configured to receive, from the AP MLD via one of the STAs, an indication that the first link is to be disabled or deleted, and
transmit the request to transfer the TWT schedule from the first link to the second link in response to the indication.

15. A method of wireless communication performed by an access point (AP) multi-link device (MLD), the method comprising:

negotiating with a non-AP MLD to establish a target wake time (TWT) schedule for communications on a first link formed between the AP MLD and the non-AP MLD;

receiving, from the non-AP MLD, a request to transfer the TWT schedule from the first link to a second link formed between the AP MLD and the non-AP MLD; and in response to the request, establishing the TWT schedule for communications on the second link.

16. The method of claim 15, further comprising establishing the TWT schedule for the communications on the second link using a same set of TWT parameters that was negotiated for the communications on the first link.

17. The method of claim 15, wherein:

the request includes information indicating a modified set of TWT parameters to be used for the communications on the second link, the modified set of TWT parameters is modified based on a set of TWT parameters that was negotiated to be used for the communications on the first link, and the method further comprises establishing the TWT schedule for the communications on the second link using the modified set of TWT parameters.

18. The method of claim 15, wherein the method further comprises:

using a timing synchronization function (TSF) value of the first link as a reference TSF value for a wake time of the TWT schedule on the second link, or using a TSF value of the second link as a reference TSF value for the wake time of the TWT schedule on the second link.

19. The method of claim 15, wherein:

the request includes information indicating a new traffic identifier (TID)-to-link mapping for the second link to accommodate use of the TWT schedule for the communications on the second link, and the method further comprises transmitting, to the non-AP MLD, a response that indicates that the new TID-to-link mapping is accepted.

20. The method of claim 15, wherein:

the request includes information indicating a new traffic identifier (TID)-to-link mapping for the second link to accommodate use of the TWT schedule for the communications on the second link, and the method further comprises transmitting, to the non-AP MLD, a response that includes information indicating a different new TID-to-link mapping for the second link to accommodate the use of the TWT schedule for the communications on the second link.

* * * * *